April 26, 1960     D. TANN ET AL     2,933,960
STUD DRIVING CHUCK
Filed June 10, 1957
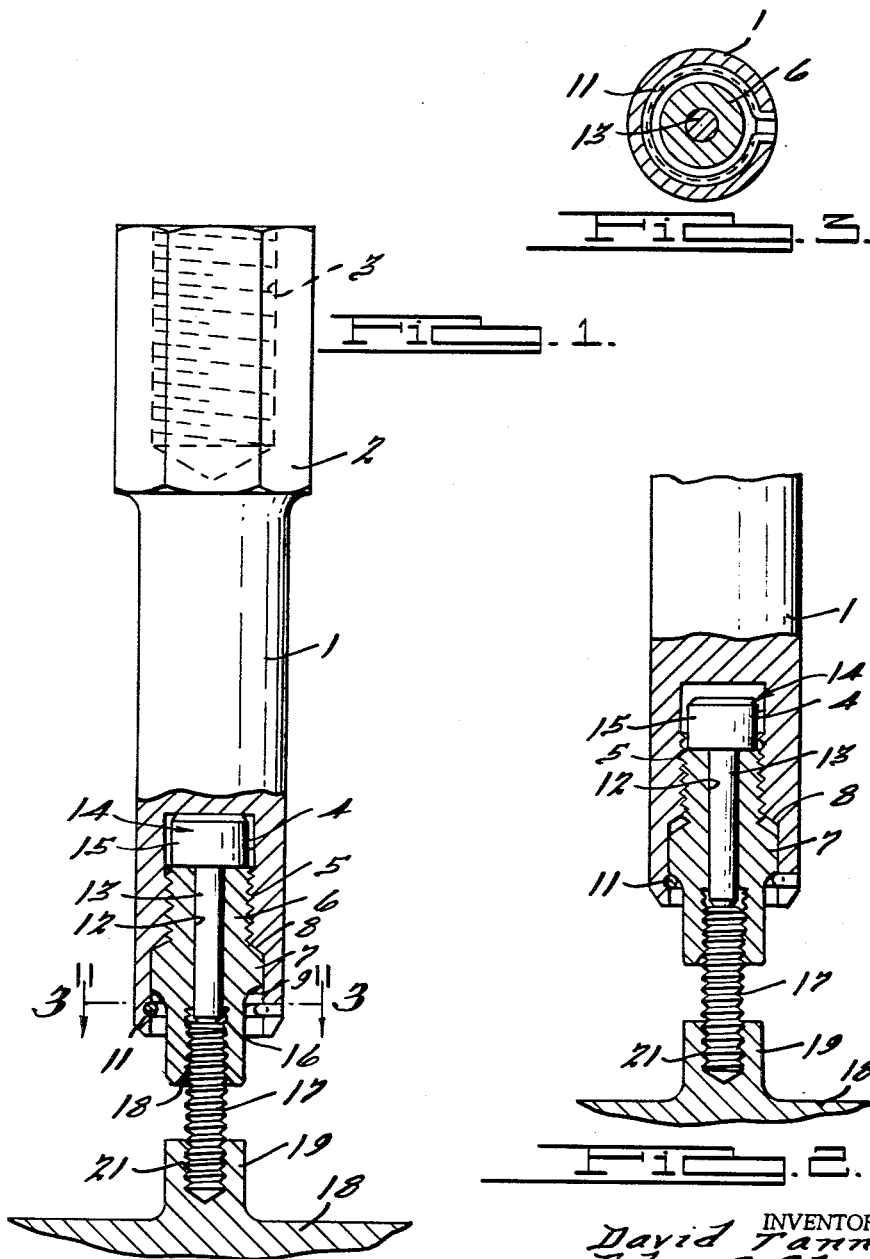
INVENTORS.
David Tann.
John S. Glass.
BY
Harness, Dickey & Pierce
ATTORNEYS.

United States Patent Office 2,933,960
Patented Apr. 26, 1960

2,933,960
STUD DRIVING CHUCK

David Tann, Detroit, and John S. Glass, Ypsilanti, Mich., assignors to Studrive, Inc., Detroit, Mich., a corporation of Michigan Application June 10, 1957, Serial No. 664,636

8 Claims. (Cl. 81—53)

This invention relates to a stud driving chuck and has for its object the provision in such a chuck of means to insure withdrawal of the chuck from the stud which will remain in its driven position.

Another object of the invention is the provision of a stud driving chuck having means to lock the stud and chuck in positive driving relation and to release said positive connection at the beginning of withdrawal rotation of the chuck to facilitate withdrawal of the chuck from the stud.

Another object of the invention is the provision of a stud driving chuck having the stud receiving portion movable relative to the main body of the chuck upon driving rotation of the chuck to lock the chuck and stud in positive relation and in which said portion moves relative to the main body portion of the chuck upon withdrawal rotation of said chuck to release said positive connection and facilitate rotation of said stud receiving portion relative to the stud.

Other objects and features of novelty of the invention will be specifically pointed out or will become apparent when referring, for a better understanding of the invention, to the following description taken in conjunction with the accompanying drawing, wherein:

Figure 1 is an elevational view of a chuck according to the present invention, with the lower portion thereof in section to show internal parts in their stud driving position;

Fig. 2 is a view similar to the lower portion of Fig. 1, with parts shown in their chuck withdrawing position, and Fig. 3 is a detail sectional view taken on the line 3—3 of Fig. 1.

The stud driving chuck of this invention as specifically illustrated in the drawing comprises a body portion 1 having at its upper end suitable attachment means conforming to the machine in which it is to be mounted and here shown as a hexagonal end portion 2 having an interiorly threaded end opening 3.

The lower end of the chuck is provided with a recess 4 extending into the body portion 1 and threaded at 5 to receive a member 6 which is thereby mounted within the recess for movement rotatably and longitudinally of the body portion. The member 6 is provided with an annular enlarged portion 7 received within a corresponding enlargement in the recess 4 and providing an upper shoulder 8 and a lower shoulder 9. A retainer ring 11, mounted in an annular groove in the recess wall, is engaged by the shoulder 9 to limit longitudinal movement of the member 6 outwardly of the recess 4.

The member 6 is provided with an opening 12 through the longitudinal axis thereof, in which is disposed the stem 13 of an anvil member 14 having a head 15 disposed between the interior end of the member 6 and the bottom of the recess 4. The lower portion of the opening 12 is enlarged at 16 and threaded as shown to receive the stud 17, the end of the opening being chamfered at 20 to facilitate insertion of the stud within the chuck. The piece in which the stud 17 is to be driven is shown at 18 as provided with a hub 19 having an unthreaded opening 21 therein into which the stud 17 is to be driven. The piece 18 is formed of a material softer than the stud 17 as, for example, die cast metal or plastic, so that the stud 17 will cut its own threads within the opening 21.

The threads at 5 between the member 6 and the wall of recess 4 are, as illustrated, of greater diameter and considerably coarser than the threads on the stud 17 so that the member 6 is more easily rotated relative to the body portion 1 of the chuck than is the member 6 rotated relative to the stud 17.

Fig. 2 not only shows the relation of the parts 1, 6, and 14 after initial separation movement of the chuck but also the position of these parts before the stud 17 is picked up by the chuck. No particular means for feeding the studs to the chuck is shown as such means forms no part of the present invention and the chuck could be used with manual insertion of the stud therein.

As the chuck engages the stud 17 rotatably, member 6 will first rotate relative to the stud which will thereby enter the threaded enlarged opening 16 until a sufficient number of threads are engaged to offer a greater resistance than exists at the threads 5, whereupon the body portion 1 of the chuck rotates relative to the member 6 to effect longitudinal movement of the member 6 inwardly of the recess 4. Rotative movement between the body portion 1 and the member 6 continues until engagement is effected therebetween at the shoulder 8 or the head 15 is clamped between the bottom of recess 4 and the end of member 6, or both. Continued rotation of the chuck then effects further insertion of the stud 17 within the opening 16 until the end of the stud engages the end of the stem 13 of the anvil 14.

If, when rotation between the body portion 1 and the member 6 stops, the collar 15 is clamped between these parts, the stud 17 engagement with the anvil 14 immediately results in locking the parts together for positive drive of the stud 17. If the body portion 1 and the member 6 engage at the shoulder 8 before the anvil is clamped, engagement of the stud with the anvil will effect movement of the anvil into engagement with the bottom of the recess 4 to lock the parts in positive driving relation. After this positive connection is effected, continued rotation of the chuck will insert the stud 17 within the opening 21 in hub 19, the stud 17 cutting its own threads therein as previously described, and assuming the position shown in Fig. 1.

After the stud is driven into the piece in which it is to be mounted, rotation of the chuck is reversed to effect withdrawal thereof. As previously described, rotation between the member 6 and the body portion 1 at the threads 5 is more easily effected than rotation relative to the stud 17, hence upon initial reverse rotation of the chuck it first rotates relative to the member 6 to effect longitudinal movement of the member 6 relative to the body portion 1 outwardly of the recess 4 until shoulder 9 engages ring 11. With this relative movement of the member 6 and the body portion 1, the positive connection between stud 17, member 6, anvil 14 and body portion 1 is broken since a clearance now appears between the head 15 of the anvil 14 and the bottom of the recess 4, as shown in Fig. 2. The anvil 14 being freely movable longitudinally of the member 6, the stud 17 and member 6 are now freely relatively rotatable as the chuck continues to rotate in the withdrawing direction. It is clear that since the stud 17 cut its own threads within the piece 18, a greater resistance will exist to relative movement between stud 17 and piece 18 than exists between the now freely relatively rotatable member 6 and stud 17 so that withdrawal of the chuck with the driven stud remaining in place is ensured.

What is claimed is:

1. A stud driving chuck comprising a body portion, a recess in one end of said body portion, an anvil having an axial extension in said recess with one end adjacent to the end of said recess and its axial extension outwardly therefrom, a rotatable member threaded in said recess so as to be longitudinally movable therein upon relative rotation between said member and body portion, said member having a portion extending outwardly from the proximate end of said body portion and an axial opening therethrough with said anvil extension extending through the interior portion of said opening and freely movable longitudinally of the member, the extended portion of said member being internally threaded to receive a stud movable longitudinally of the member upon relative rotation therebetween into positive driving engagement with the anvil extension.

2. A stud driving chuck comprising a body portion, a recess in one end of said body portion, an anvil having an axial extension in said recess with one end adjacent to the end of said recess and its axial extension outwardly therefrom, a rotatable member threaded in said recess so as to be longitudinally movable therein upon relative rotation between said member and body portion, said member having a portion extending outwardly from the proximate end of said body portion and an axial opening therethrough with said anvil extension extending through the interior portion of said opening and freely movable longitudinally of the member, the extended portion of said member being internally threaded to receive a stud movable longitudinally of the member upon relative rotation therebetween into positive driving engagement with the anvil extension, and means for limiting outward movement of said member relative to said body portion to a position where it is still threaded in said recess.

3. A stud driving chuck comprising a body portion, a recess in one end of said body portion, an anvil having an axial extension in said recess with one end adjacent to the end of said recess and its axial extension outwardly therefrom, a rotatable member threaded in said recess so as to be longitudinally movable therein upon relative rotation between said member and body portion, said member having a portion extending outwardly from the proximate end of said body portion and an axial opening therethrough with said anvil extension extending through the interior portion of said opening and freely movable longitudinally of the member, the extended portion of said member being internally threaded to receive a stud movable longitudinally of the member upon relative rotation therebetween into positive driving engagement with the anvil extension, the threads between said member and body portion being more readily relatively rotatable than the threads between said stud and the interior of said member so that rotation of the chuck relative to a stud to engage it is accompanied by relative rotation between said member and body portion and longitudinal movement of the member interiorly of the recess with subsequent locking of said body portion, anvil, member and stud into positive driving relation.

4. A stud driving chuck comprising a body portion, a recess in one end of said body portion, an anvil having an axial extension in said recess with one end adjacent to the end of said recess and its axial extension outwardly therefrom, a rotatable member threaded in said recess so as to be longitudinally movable therein upon relative rotation between said member and body portion, said member having a portion extending outwardly from the proximate end of said body portion and an axial opening therethrough with said anvil extension extending through the interior portion of said opening and freely movable longitudinally of the member, the extended portion of said member being internally threaded to receive a stud movable longitudinally of the member upon relative rotation therebetween into positive driving engagement with the anvil extension, the threads between said member and body portion being more readily relatively rotatable than the threads between said stud and the interior of said member so that rotation of the chuck relative to a stud to engage it is accompanied by relative rotation between said member and body portion and longitudinal movement of the member interiorly of the recess with subsequent locking of said body portion, anvil, member and stud into positive driving relation, reverse rotation of said chuck after the stud is driven into place first effecting relative rotation and longitudinal movement between said member and body portion to release the positive drive and provide for free rotative movement between the member and stud to facilitate disengagement of the chuck.

5. A stud driving chuck comprising a body portion, a recess in one end of said body portion, an anvil having an axial extension in said recess with one end adjacent to the end of said recess and its axial extension outwardly therefrom, a rotatable member threaded in said recess so as to be longitudinally movable therein upon relative rotation between said member and body portion, said member having a portion extending outwardly from the proximate end of said body portion and an axial opening therethrough with said anvil extension extending through the interior portion of said opening and freely movable longitudinally of the member, the extended portion of said member being internally threaded to receive a stud movable longitudinally of the member upon relative rotation therebetween into positive driving engagement with the anvil extension, and means for limiting outward movement of said member relative to said chuck to a position where it is still threaded in said recess.

6. A stud driving chuck comprising a body portion having a rotative axis, said body portion having a recess in the end with its axis aligned with said rotative axis, a member threaded in said recess and having a central opening, and a headed pin having its stem disposed in the central opening in the member and its head movable between the bottom of the recess and the interior end of the member, the wall of the opposite end of the opening in said member being threaded to receive a stud which is moved into engagement with the end of said stem.

7. A stud driving chuck comprising a body portion having a rotative axis, said body portion having a recess in the end with its axis aligned with said rotative axis, a member threaded in said recess and having a central opening, means limiting the movement of said member out of said recess to a position where it remains threaded therein, and a headed pin having its stem extending into the interior end of the opening in the member and its head between the bottom of the recess and the interior end of the member, the wall in the extending end of the opening in said member being threaded to receive a stud which is moved into engagement with the end of said stem.

8. A stud driving chuck comprising a body portion having a rotative axis, said body portion having a recess in the end with its axis aligned with said rotative axis, a member threaded in said recess and having a central opening, means limiting the movement of said member out of said recess to a position where it remains threaded therein, and a headed pin having its stem disposed in the interior end of the member opening and its head between the bottom of the recess and the interior end of the member, the opening at the extending end of said member being internally threaded to receive a stud which is moved into engagement with the end of said stem, the threads between said member and body portion being more readily relatively rotatable than the threads between said stud and member so that insertion of a stud in the member by rotation of the chuck relative to the stud results in relative rotation between said member and body portion and consequent movement of the member interiorly of the recess to a limited position, further rotative movement of the chuck effecting relative rotation of the member and stud to move the stud into engagement with the end of the stem to lock said body portion, pin, member and stud into positive driving relation, initial reverse rotation of the chuck to remove it from the stud effecting reverse relative rotation between the member and body portion and movement of the member outwardly of the recess to the position determined by said limiting position whereupon the member is freely rotatable relative to the stud to effect disengagement of the chuck therefrom while leaving the stud in its driven position.

References Cited in the file of this patent

UNITED STATES PATENTS

| | | |
|---|---|---|
| 1,298,324 | Funk | Mar. 25, 1919 |
| 1,438,269 | Sehrt | Dec. 12, 1922 |
| 2,257,089 | Caminez | Sept. 20, 1941 |
| 2,334,088 | Hass et al. | Nov. 9, 1943 |
| 2,351,232 | Schnabolk | June 13, 1944 |
| 2,488,933 | Randolph | Nov. 22, 1949 |
| 2,622,466 | Vanden Bos et al. | Dec. 23, 1952 |
| 2,800,820 | Ratterath | July 30, 1957 |

FOREIGN PATENTS

| | | |
|---|---|---|
| 18,142 | Great Britain | Nov. 11, 1890 |
| 125,298 | Great Britain | Apr. 17, 1919 |